United States Patent [19]

Bruere-Dawson et al.

[11] Patent Number: 4,788,384
[45] Date of Patent: Nov. 29, 1988

[54] DEVICE FOR TWO-DIMENSIONAL LOCALIZATION OF EVENTS THAT GENERATE CURRENT ON A RESISTIVE SURFACE

[75] Inventors: Roger Bruere-Dawson, Saulx Les Chartreux; Marcel Froissart, Paris, both of France; Bernard M. Marechal, Marcio N. DeSouza, both of Rio de Janeiro, Brazil

[73] Assignee: Centre National de la Recherche Scientifique, France

[21] Appl. No.: 134,354

[22] Filed: Dec. 17, 1987

[30] Foreign Application Priority Data

Dec. 18, 1986 [FR] France .................. 86 17744

[51] Int. Cl.$^4$ ............................................ G08C 21/00
[52] U.S. Cl. ........................................ 178/18; 178/19
[58] Field of Search ................................ 178/18, 19

[56] References Cited

U.S. PATENT DOCUMENTS 3,798,370  3/1974  Hurst ..................................... 178/18
4,129,747  12/1978  Pepper .................................. 178/19

FOREIGN PATENT DOCUMENTS 2181350  4/1973  France .
2463955  8/1979  France .
2522406  5/1982  France .
58-99889  6/1983  Japan .
1168427  3/1968  United Kingdom .

Primary Examiner—Stafford D. Schreyer
Attorney, Agent, or Firm—Mason, Fenwick & Lawrence

[57] ABSTRACT

Electrodes are placed at the periphery of a resistive surface to pick up a current generated at a point on the resistive surface. Each electrode is connected to at least three summing lines via respective resistors each having a fixed resistance value which is predetermined as a function of the summing line and of the electrode in such a manner as to obtain analog signals from at least two of the summing lines which are linear functions of respective co-ordinates (with respect to a predetermined co-ordinate system) of a point on the resistive surface at which current is generated.

11 Claims, 6 Drawing Sheets

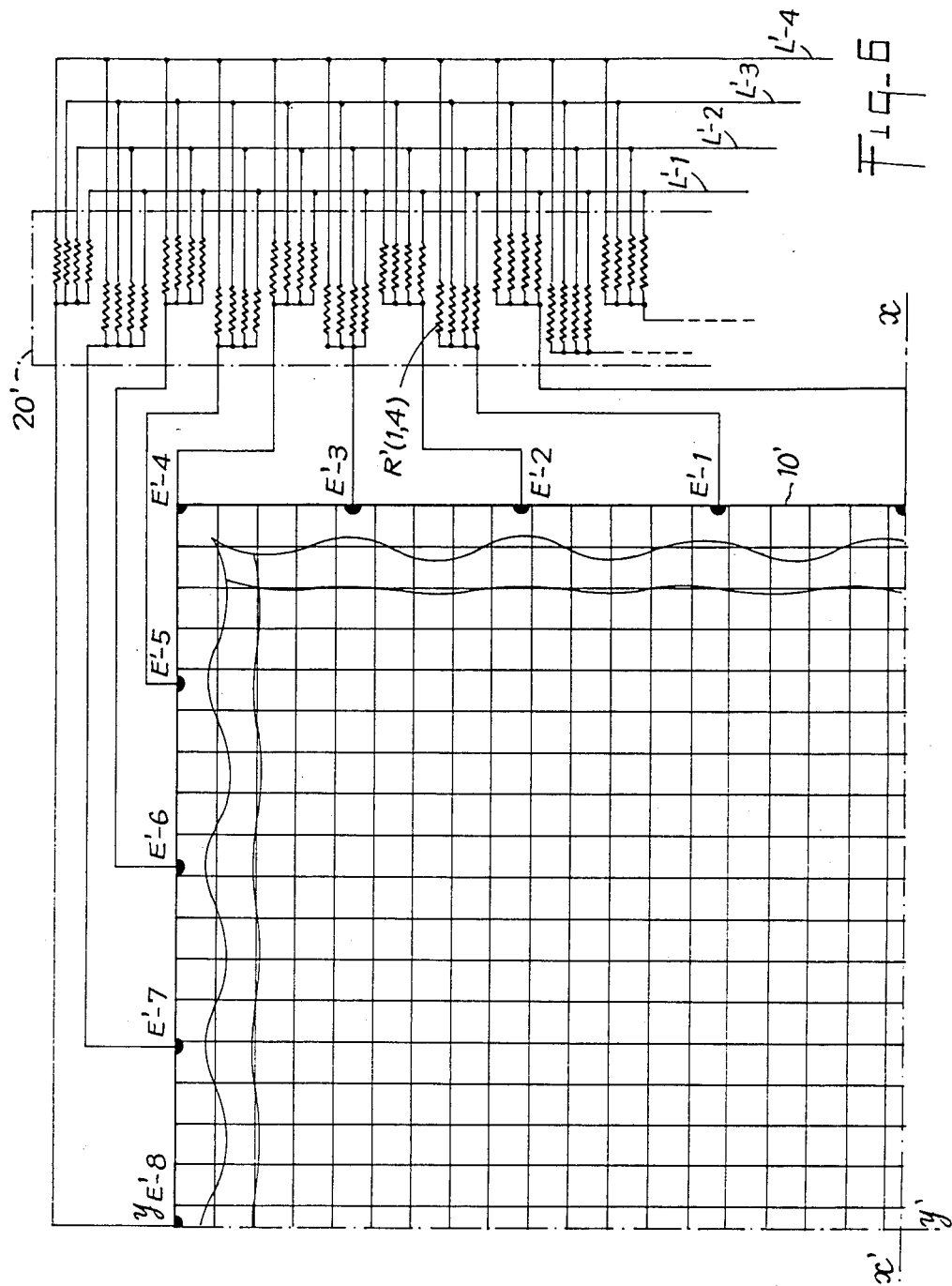

DEVICE FOR TWO-DIMENSIONAL LOCALIZATION OF EVENTS THAT GENERATE CURRENT ON A RESISTIVE SURFACE

FIELD OF THE INVENTON

The present invention relates to a device for two-dimensional localization of events that generate current on a resistive surface.

More particularly, the invention provides a device of the type comprising electrodes fixed around the resistive surface in order to pick up currents generated by injecting current or electric charge at points on the resistive surface, together with a circuit connected to the electrodes for generating signals based on the picked-up currents and representative of the co-ordinates of said points in a predetermined co-ordinate system.

Position detectors for two-dimensional localization of current-generating events, e.g. particle impacts on wires which may optionally be amplified by electromagnetic cascades, or injections of electric charge by contact or by induction, have applications in numerous fields such as astronomy, crystallography, medical nuclear imaging, and computerized graphics devices using digitizer pads or direct pointing on a screen (if the device is transparent).

One of the main difficulties encountered in making localization devices of the above type is obtaining a linear relationship between the generated signals representing the coordinates of the locations of events, and the real values of said co-ordinates, so as to be able to provide an undistorted image of event locations.

BACKGROUND OF THE INVENTION

French patent application No. 2 463 955 describes a localization device using a rectangular resistive plate provided with contacts disposed along its sides. The electrical contacts situated along a single side are connected to a corresponding common summing line via respective resistances. The summing lines associated with two opposite sides are connected to the inputs of a differential circuit which delivers an analog signal representative of one of the two co-ordinates of the point at which the electrical charge was injected which gave rise to the currents picked-up by the various contacts. The summing lines associated with the other two sides are connected to the inputs of another differential circuit which delivers an analog signal representative of the other co-ordinate of the point.

A special selection of resistance values connecting the contact points to the summing lines makes it possible to minimize distortion but does not avoid it altogether.

Japanese patent application published under the No. 58-99889 also describes a localization device using a rectangular resistive plate provided with electrical contacts connected to summing lines via particular resistances. In order to reduce distortion, resistances are inserted between the electrical contacts situated on two adjacent sides of the plate, in particular between contacts close to the corners of the plate.

Here again, although distortion is reduced, it nevertheless remains significant.

Another technique for eliminating distortion consists in converting the amplitudes of the currents picked up by the electrodes into digital form (optionally after summation and normalization) and then in using computer means to process the digital values obtained in order to correct for the distortion. It is relatively expensive to use computer means in this way and, in some applications, the delay resulting from processing time can be particularly troublesome. Further, distortion varies over time and with environmental conditions. The function for correcting a particular nonlinearity at a given instant need not be valid later on.

In order to reduce nonlinearity, proposals have also been made to use specially-shaped electrodes. However nonlinearity is not completely eliminated. Computer processing is still required to correct distortion with the same drawbacks as mentioned above together with the additional difficulty of making the specially-shaped electrodes.

The present invention seeks to provide a localization device which supplies signals representative of an undistorted image without requiring cmputer processing or particularly complicated electrodes.

SUMMARY OF THE INVENTION

This aim is achieved by means of a device for two-dimensional localization of current-generating events on a resistive surface, the device comprising:

a resistive surface;

a plurality of electrodes fixed to the resistive surface around its periphery in order to pick up currents generated by injecting current or electric charge into points on the resistive surface; and at least three current summing lines connected to the electrodes via discrete resistive components in such a manner as to obtain analog signals on said summing lines whose amplitudes are functions of the co-ordinates of said points in a predetermined reference co-ordinate system;

the device including the improvement whereby:

each of said electrodes is connected by means of respective resistive components to at least three summing lines in such a manner that at least two of the said lines deliver analog signals whose amplitudes are substantially linear functions of the desired co-ordinates.

The fact of connecting each electrode to at least three summing lines is an essential characteristic of the invention since it is a necessary condition for obtaining at least two signals which are linear or quasi-linear functions of the looked-for co-ordinates, i.e. for having undistorted position information directly available in analog form. Taking the minimum case of three summing lines, the currents picked up by the electrodes split into three fractions: first fractions which are combined by a first summing line to provide a current whose magnitude is a linear function of both co-ordinates (or of a first one of the two co-ordinates); second fractions which are combined by a second summing line and provide a current whose magnitude is a linear function of both co-ordinates (or of the second co-ordinate); and third fractions which constitute excess fractions of the currents picked up by the electrodes and which are removed by the third summing line, e.g. to ground.

A localization device in accordance with the invention is thus distinguished from prior art devices making use of summing lines and in which each electrode is connected via a resistance to one, or at most to two, summing lines. Given the above explanation, the fact that each electrode is not connected to a third summing line makes it impossible to get rid of the excess fraction of current picked up by the electrode, thereby necessarily giving rise to distortion.

Further, in comparison with computerized distortion correcting systems, a device in accordance with the invention is not only cheaper than computerized correction means, but also has the advantage of providing signals quasi-instantaneously so that a true image of detected events can be displayed, for example on an oscilloscope screen.

In a particular embodiment of the invention, the resistive surface is disk-shaped and the electrodes are distributed around the circumference of the disk. However, other resistive surface shapes could also be used, e.g. rectangular surfaces or square surfaces.

The relationship between the signals obtained on the summing lines and the desired co-ordinates approaches increasingly closer to a perfect linear function with an increasing number of electrodes, with distortion remaining only in a peripheral margin of the surface having a width which is less than the inter-electrode spacing. In practice, the number of electrodes should preferably be chosen to be not less than 16.

Further, in order to ensure that the current picked up by an electrode is not affected by the resistances inserted between the electrode and the summing lines, the values of the resistances and the resistivity of the resistive surface should be selected in such a manner that, seen from an electrode, the resistance of the resistive surface is not too much less than the resistance of the summing network.

Naturally, the number of summing lines to which each electrode is connected is not limited to three. One or more additional summing lines may be provided so that by combining the signals obtained from said lines it is possible to avoid the constraint of imposed coefficients in the linear relationships between these signals and the desired co-ordinates and/or to eliminate common mode interference signals.

BRIEF DESCRIPTION OF THE DRAWINGS

Embodiments of the invention are described by way of example wtth reference to the accompanying drawings, in which:

FIG. 6 is a fragmentary diagrammatic view of another embodiment of a localization device in accordance with the invention.

MORE DETAILED DESCRIPTION

Figure 1:
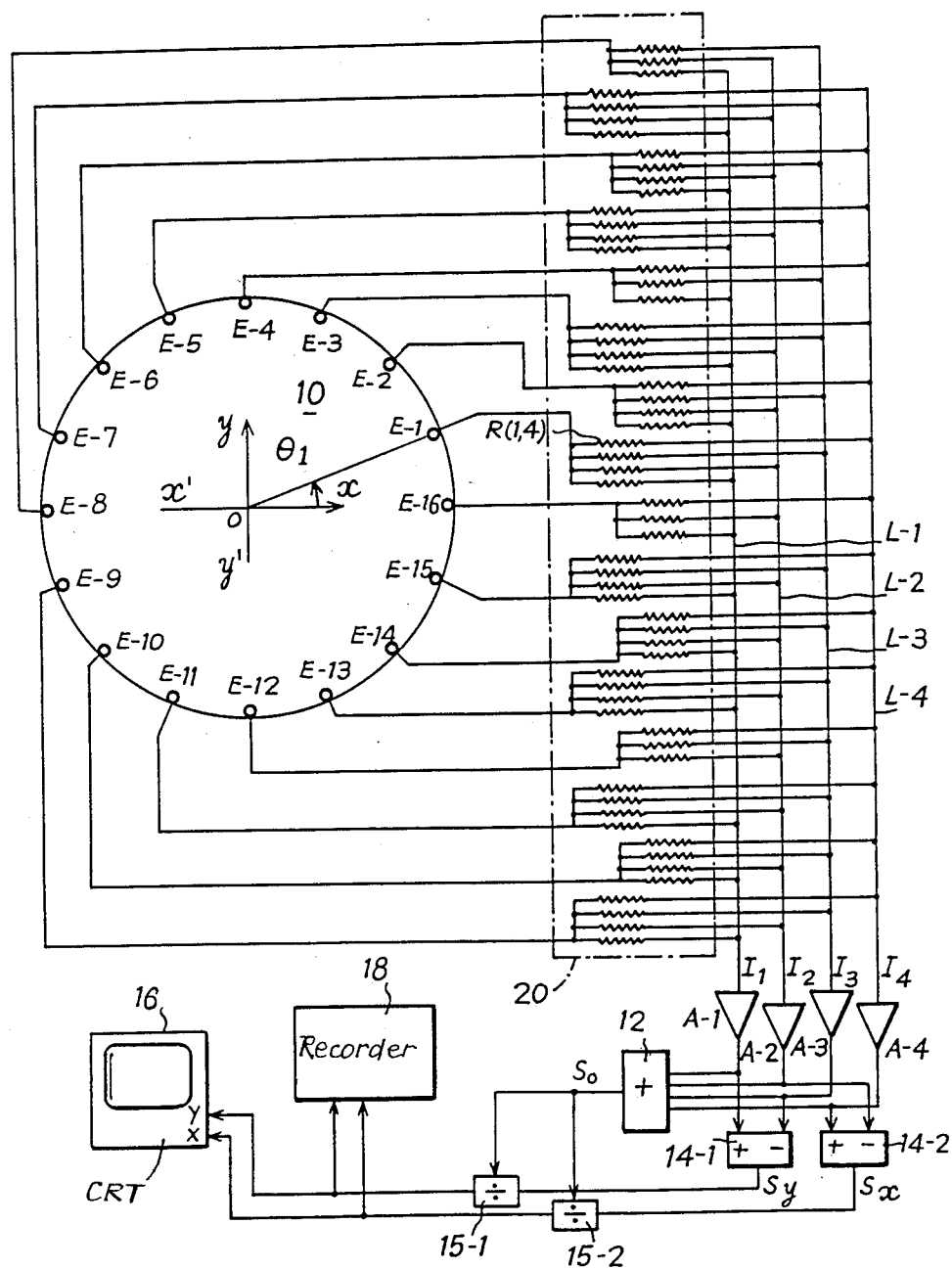
FIG. 1 is a diagram of a first embodiment of a two-dimensional localization device in accordance with the invention.

A particular embodiment of a device in accordance with the invention is now described with reference to FIG. 1.

The localization device comprises a resistive surface 10 with electrodes E-1 to E-16 fixed around the perimeter thereof and connected to four summing lines L-1 to L-4 via a resistive network 20.

The resistive surface 10 is made of a material having uniform surface resistivity, for example graphite-coated paper placed on a rigid support with the conducting face of the graphite-coated paper naturally facing outwardly in order to provide access to the resistive layer of graphite. In the example shown, the resistive surface 10 is in the form of a disk of radius R.

The localization device is useable as a particle detector, for example in nuclear imaging for medical, scientific, or industrial purposes so as to provide a two-dimensional image of the positions of impact points on the resistive surface of particles to be detected or of charges derived from said particles by electron avalanche techniques.

The localization device is also useable as a position detector for graphical data input, e.g. in a digitizing table. Graphical data is input by means of a tool such as a stylus which injects an electric current into the resistive surface. It may be observed that the resistive surface and its support may then be provided in the form of flexible and/or transparent films for inputting graphical data from a surface which is not necessarily flat.

The injected current may be D.C., with electrical charge being injected by contact with the resistive surface, or it may be A.C., e.g. an HF current, in which case the electric charge can be injected by capacitive induction without direct contact with the resistive surface.

A plurality of electrodes are fixed around the disk 10. As already mentioned, the number of electrodes must be relatively high. In the example shown, 16 electrodes E-1 to E-16 are provided, and they are disposed at regular intervals. Placing electrodes at regular intervals, or at least in diametrically opposite pairs, is not absolutely essential, but it does simplify the definition of the resistive network 20.

The currents picked up by the electrodes E-1 to E-16 when electric currents are generated by events located at points on the resistive surface 10 are combined by the resistive network 20 in order to provide signals whose amplitudes vary linearly as a function of the co-ordinates of said points in a given system of co-ordinates.

In the example shown, the system of co-ordinates is constituted by two orthogonal axes x'x and y'y having their origin O at the center of the disk 10, and the resistive network 20 is designed so as to obtain currents $I_1$, $I_2$, $I_3$, and $I_4$ on the summing lines L-1, L-2, L-3, and L-4 respectively with the following values:

$$I_1 = (I_O/4) + aY \tag{1}$$

$$I_2 = (I_O/4) - aX \tag{2}$$

$$I_3 = (I_O/4) - aY \tag{3}$$

$$I_4 = (I_O/4) + aX \tag{4}$$

Where $I_O$ and $a$ are fixed quantities and X and Y are the coordinates of the point of impact or of injection in the system of co-ordinates (x'x, y'y).

The inventors have shown, that in order to achieve this result, each electrode must be connected to each summing line by a discrete resistive component whose conductance is given by:

$$G(n, 1) = (G/4)(1 + \cos(\theta_n - \theta_1)) \tag{5}$$

where:

G(n, 1) is the conductance of the circuit inserted between the n-th electrode E-n and the 1-th summing line L-1, i.e. the reciprocal of the resistance R(n, 1) connecting said n-th electrode to the 1-th line;

G is a predetermined fixed value representing the sum of the conductances connecting any one of the electrodes to the summing lines;

$\theta_n$ is the angle formed relative to Ox by the radius on which electrode E-n is situated, and in the embodiment shown in FIG. 1, $\theta_n$ is equal to $(n/N)2\pi$, where N is the total number of electrodes, i.e. 16 in the present example;

n is an integer taking all of the values from 1 to N;

$\theta_l$ is an angle such that the signal on summing line L-1 is a linear function of the co-ordinate along the axis at angle $\theta_l$ relative to Ox, and in the embodiment shown in FIG. 1, $\theta_l$ is equal to $2\pi l/4$, and l is an integer taking all of the values from 1 to 4, giving $\theta_l$ the following values: $\pi/2$ (Y co-ordinate); $\pi$ (−X co-ordinate); $3\pi/2$ (−Y co-ordinate); and $2\pi$ (X co-ordinate).

In FIG. 1, it can be seen that for each electrode situated on the axes x'x and y'y, the value of the conductance inserted between said electrode and one of the summing lines may have the value 0, in which case there is no resistor connected between that electrode and said summing line. Naturally, it is not essential to have electrodes disposed on the co-ordinate axes, in which case there would always be a non-infinite resistance R(n, l) between each electrode and each line.

The currents $I_1$, $I_2$, $I_3$, and $I_4$ obtained on the summing lines are amplified by respective current amplifiers A-1, A-2, A-3, and A-4 having the same gain k. The amplified signals are applied to the inputs of an analog adder 12 which delivers an output signal $S_0 = kI_0$. Two other analog circuits 14-1 and 14-2 operate as subtractors, one of them receiving the amplified signals $kI_1$ and $kI_3$ and the other receiving the amplified signals $kI_4$ and $kI_2$ in order to provide the following signals:

$$S_X = k(I_4 - I_2) = 2kaX; \text{ and}$$

$$S_Y = k(I_1 - I_3) = 2kaY.$$

This provides two analog signals $S_X$ and $S_Y$ which are proportional to the X and Y co-ordinates. The signals $S_X$ and $S_Y$ are transmitted to the inputs of an oscilloscope 16 in order to obtain in quasi-instantaneous manner an undistorted image of the pattern formed by the locations at which events take place on the resistive surface 10. The signals $S_X$ and $S_Y$ may be applied directly to the inputs of the oscilloscope 16, or, as shown in the example, they may be applied thereto after normalization by dividing by $S_O$ using respective dividers 15-1 and 15-2 in order to eliminate fluctuations in the injected signal $I_O$.

The signals $S_X$ and $S_Y$ (whether normalized or not) and optionally the signals $S_O$, $kI_1$, $kI_2$, $kI_3$, and $kI_4$ may be applied to the inputs of a recorder 18 for subsequent processing, e.g. digitizing and storage.

In a variant, the signals $kI_1$, $kI_2$, $kI_3$, and $kI_4$ may be processed by digital means after conversion using analog-to-digital converters connected to the outputs of the amplifiers A-1, A-2, A-3, and A-4.

The coefficient of sensitivity a relating the signals obtained to the co-ordinate that they represent, c.f. equations (1) to (4), is obviously limited to $(I_O/4R)$. It gets closer to this value when the currents picked up by the electrodes are not affected by the summing network and by the input impedances Z of the current amplifiers A-1 to A-4. Further, the values of the conductances in the summing network as given by equation (5) give improving results with lower values of this input impedance Z. That is why the following results should preferably be satisfied:

$$R_\square \gtrsim 1/G \gtrsim N.Z \qquad (6)$$

where the symbol $\gtrsim$ means "greater than or of the same order as" and $R_\square$ is the resisitivity per square of the resistive surface 10, i.e. the resistance between opposite sides of a square on the surface.

A device of the type shown in FIG. 1 has been built using a 260 mm diameter disk of graphite-coated paper glued onto a rigid insulating support in order to constitute the resistive surface 10. The surface resisitivity $R_\square$ is about 6.2 kohms per square. The device has 32 electrodes (rather than the 16 electrodes shown in FIG. 1) which are constituted by 3.2 mm diameter circular pads fixed at regular intervals around a circle of diameter 256.8 mm and which are electrically connected to the disk by a silver paint.

The resistors R(n, l) for weighting the contributions of the currents picked up by the electrodes to the currents made available to the summing lines are determined by selecting an equivalent conductance value G such that $1/G = 135$ ohms. This value satisfies the conditions of equation (6) above, which the input impedance of the current amplifiers used being equal to 3 ohms. The value of G is also selected so as to obtain resistance values for the resistors R(n, l) which are as close as possible to the "practical" or "preferred" values which are commercially available.

The calculated theoretical values for the resistances R(n, l) and the practical values actually used because of their availability, are given in Table 1 at the end of this description.

Figure 2:
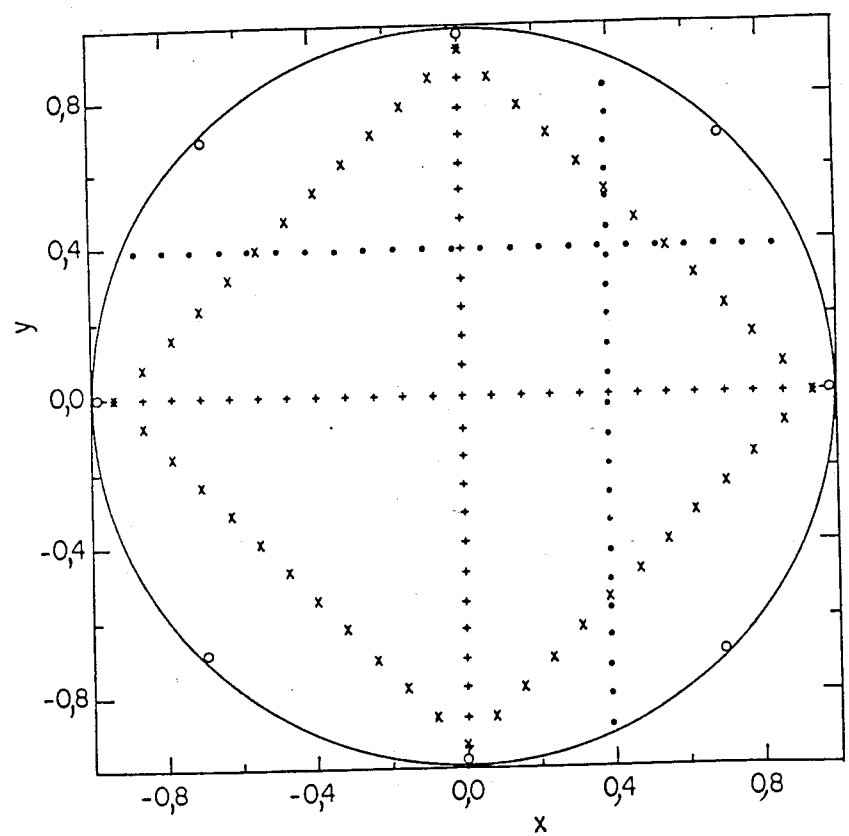
FIG. 2 is a pattern formed by current injection points on the resistive surface of a localization device of the type shown in FIG. 1.
Figure 3:
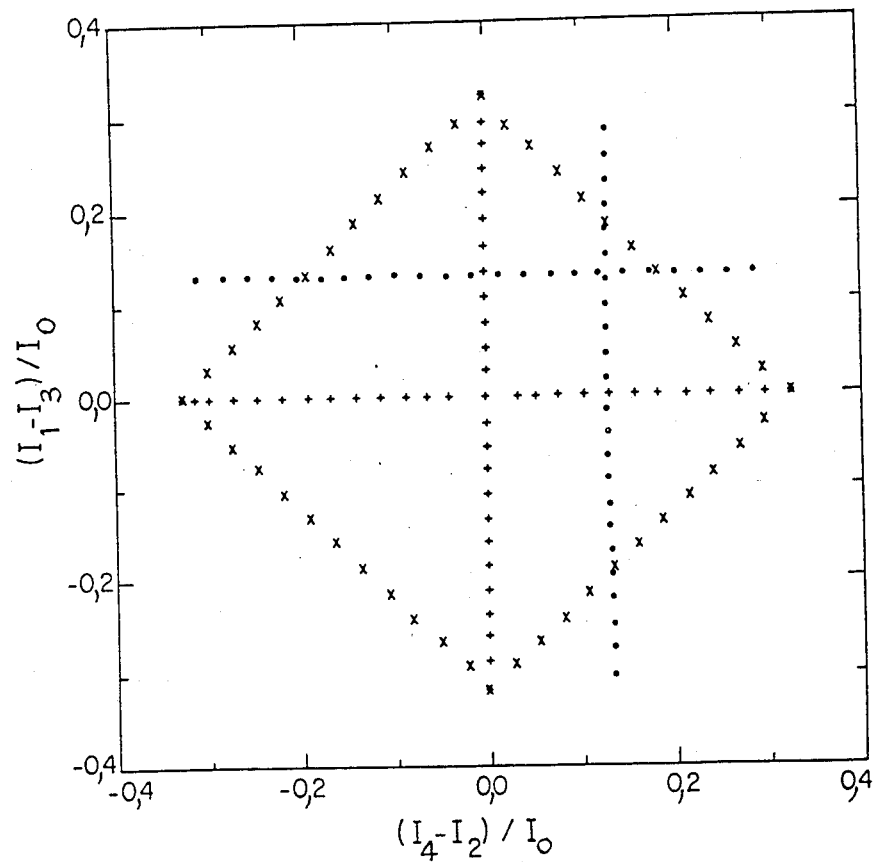
FIGS. 3 to 5 are images of the FIG. 2 pattern obtained by localization devices of the type shown in FIG. 1, using 32, 16, and 8 electrodes respectively.

The localization device made in this way was tested by injecting current pulses in succession at the various different points on the resistive surface that oonstitute the pattern shown in FIG. 2. The image of this pattern as obtained from the signals $S_X$ and $S_Y$ as obtained at the output from the summing network is shown in FIG. 3. It can be seen that the image is substantially undistorted even in its margins. ocalization errors are smaller than the spatial resolution of the device.

Figure 4:
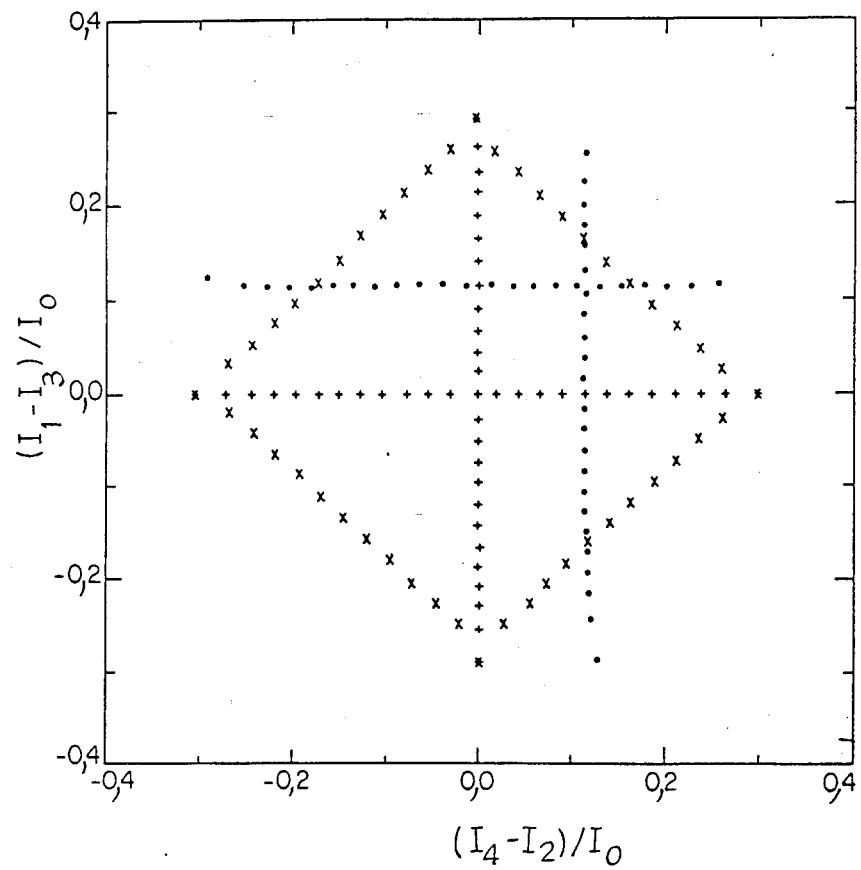
Figure 5:
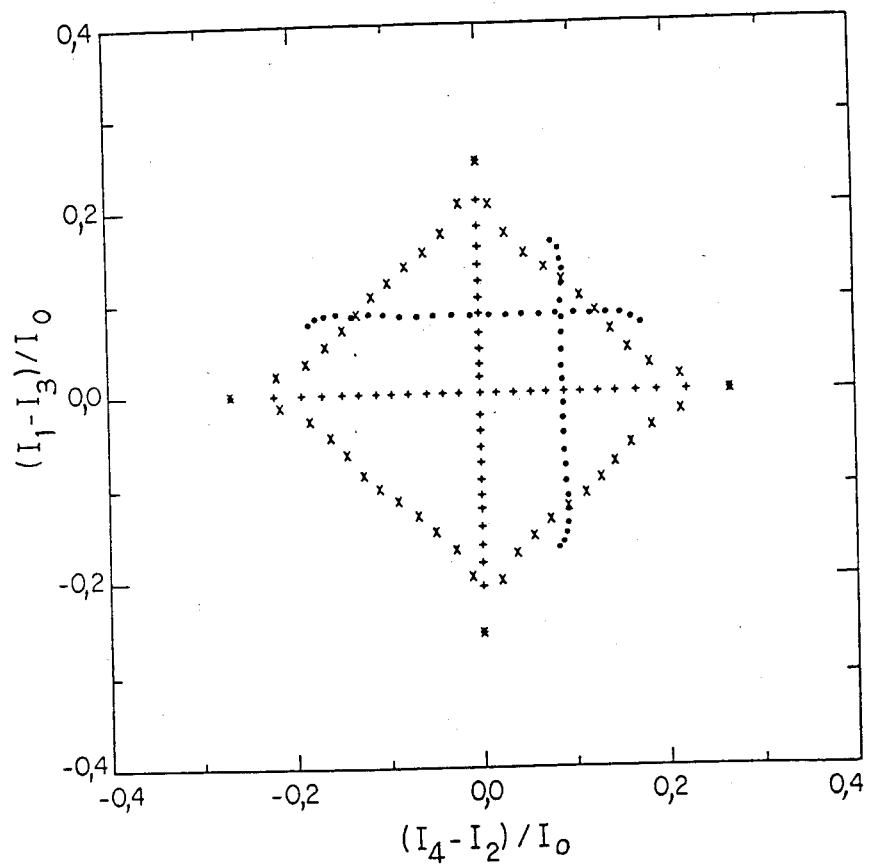

By way of comparison, the same test was performed using localization devices that differ from the above-described device solely in the number of electrodes. The images obtained with 16 electrodes and with 8 electrodes are shown in FIGS. 4 and 5, respectively. It can be seen that distortion still remains acceptable when using 16 electrodes but that it becomes relatively high in the margins of the image when using only 8 electrodes. That is why it is preferred to use at least 16 electrodes. In general, since the width of the peripheral distortion margin is less than the distance between successive electrodes, the number of electrodes should be selected so that the distance between two adjacent electrodes is no greater than the largest acceptable width for the peripheral distortion margin around the resistive surface.

In the above description, it has been assumed that four summing lines are used to provide signals which are the same linear functions of X, −X, Y and −Y. By combining such signals, it is possible to eliminate the quantity $I_O$ and to get rid of common mode interference signals. However, as already mentioned, it is possible to use only two summing lines in order to obtain signals which are linear functions of X and Y, together with a third line serving to ground excess current from each electrode.

It may also be observed that using a different resistor network makes it possible to directly obtain not only orthogonal co-ordinates, but also oblique, triangular, etc. coordinates.

The resistive surface 10 need not be disk-shaped, for example it could be rectangular or square, and it would still be possible to devise a purely resistive summing network giving rise to analog signals which are linear functions of the desired co-ordinates. In all cases, distortion is eliminated by appropriately adjusting resistance values, except for within a peripheral margin whose width is less than the distance between electrodes.

A computer simulation program has been written. Its results match those obtained by experiment on the above-described disk-shaped resistive surface.

An embodiment of a device in accordance with the invention using a square resistive surface 10' is shown in FIG. 6. In order to simplify the diagram, only one-fourth of a square plate is shown, with the remainder being symmetrical about the axes x'x and y'y.

In the example shown, the resistive plate 10' is square in shape and is provided with 32 electrodes E'-1 to E'-32 which are uniformly distributed around its periphery, with one electrode being disposed at each corner.

A resistive network 20' connects the electrodes E'-1 to E'-32 to four summing lines L'-1 to L'-4. Each electrode E'-n' (where n' takes all values from 1 to 32) is connected to each summing line L'-1' (where 1' takes the values 1 to 4) via a respective resistor R'(n', 1'). The resistances of the resistors R'(n', 1') are selected so as to provide currents on the summing lines L'-1, L'-2, L'-3, and L'-4 which are linear functions of Y, −X, −Y, and X, where X and Y are the co-ordinates of a point at which current or charge is being injected into the resistive surface 10' relative to the system of co-ordinates (x'x, y'y). The signals available on the summing lines L'-1 to L'-4 are processed in exactly the same way as described above with reference to the FIG. 1 embodiment.

The above-mentioned computer simulation program has been used to determine the optimum resistances values for the resistors R'(n', 1') and to evaluate the residual distortion.

Table 2 at the end of this description gives the theoretical resistance values for R'(n', 1') connecting the electrodes E'-1 to E'-8 visible in FIG. 6 to the four summing lines.

FIG. 6 shows two superposed grids on the surface 10', one of them is a square grid and the other represents the image of the square grid as obtained using the above-mentioned simulation program. If a distortion margin whose width is slightly less than the inter-electrode pitch is ignored, then no distortion is visible in the image obtained. This is in conformity with the results as verified experimentally using the disk-shaped resistive surface 10.

TABLE 1

Resitance values R(n, l) in network 20 (FIG. 1)

$$1/R(n, 1) = \frac{G}{4}\left(1 + \cos\left(\frac{n}{N}2\pi - \frac{1}{4}2\pi\right)\right)$$

where:
1/G = 135 ohms, n varies from 1 to N = 32, l varies from 1 to 4.

| (n, l) | R (n, l) theorical (ohms) | R (n, l) practical (ohms) |
|---|---|---|
| (1,1), (9,2), (17,3), (25,4) (7,4), (15,1), (23,2), (31,3) | 452 | 470 |
| (1,2), (9,3), (17,4), (25,1) (7,3), (15,4), (23,1), (31,2) | 28104 | 27000 |
| (1,3), (9,4), (17,1), (25,2) (7,2), (15,3), (23,4), (31,1) | 671 | 680 |
| (1,4), (9,1), (17,2), (25,3) (7,1), (15,2), (23,3), (31,4) | 273 | 270 |
| (2,1), (10,2), (18,3), (26,4) (6,4), (14,1), (22,2), (30,3) | 391 | 390 |
| (2,2), (10,3), (18,4), (26,1) (6,3), (14,4), (22,1), (30,2) | 7095 | 6800 |
| (2,3), (10,4), (18,1), (26,2) (6,2), (14,3), (22,4), (30,1) | 875 | 910 |
| (2,4), (10,1), (18,2), (26,3) (6,1), (14,2), (22,3), (30,4) | 281 | 270 |
| (3,1), (11,2), (19,3), (27,4) (5,4), (13,1), (21,2), (29,3) | 347 | 330 |
| (3,2), (11,3), (19,4), (27,1) (5,3), (13,4), (27,1), (29,2) | 3204 | 3300 |
| (3,3), (11,4), (19,1), (27,2) (5,2), (13,3), (21,4), (29,1) | 1215 | 1200 |
| (3,4), (11,1), (19,2), (27,3) (5,1), (13,2), (21,3), (29,4) | 295 | 270 |
| (4,1), (12,2), (20,3), (28,4) (4,4), (12,1), (20,2), (28,3) | 316 | 330 |
| (4,2), (12,3), (20,4), (28,1) (4,3), (12,4), (20,1), (28,2) | 1844 | 1800 |
| (8,1), (16,2), (24,3), (32,4) | 270 | 270 |
| (8,2), (16,3), (24,4), (32,1) | 540 | 560 |
| (8,4), (16,1), (24,2), (32,3) (8,3), (16,4), (24,1), (32,2) | infinite | infinite |

TABLE 2

Resistance values R'(n',1') in network 20' (FIG. 6)
The following values were determined with reference to a surface resistivity R☐ = 6200 ohms per square and to resistive amplifier input impedances Z = 5 ohms.

| (n', 1') | R'(n',1') (ohms) | (n', 1') | R'(n',1') (ohms) |
|---|---|---|---|
| (1,2),(2,2),(3,2),(4,2), (4,3),(5,3),(6,3),(7,3), (8,3) | infinite or not connected | (2,1),(6,4) | 342 |
| (5,2),(3,3) | 1342 | (3,1),(5,4) | 401 |
| (6,2),(2,3) | 865 | (4,1),(4,4) | 250 |
| (7,2),(1,3) | 622 | (5,1),(3,4) | 258 |
| (8,2),(8,4) | 489 | (6,1),(2,4) | 255 |
| (1,1),(7,4) | 296 | (7,1),(1,4),(8,1) | 256 |

We claim:
1. A device for two-dimensional localization of current-generating events on a resistive surface, the device comprising:
a resistive surface;
a plurality of electrodes fixed to the resistive surface around its periphery in order to pick up currents generated by injecting current or electric charge into points on the resistive surface; and
at least three current summing lines connected to the electrodes via discrete resistive components in such a manner as to obtain analog signals on said summing lines whose amplitudes are functions of the co-ordinates of said points in a predetermined reference co-ordinate system;

the device including the improvement whereby:

each of said electrodes is connected by means of respective resistive components to at least three summing lines in such a manner that at least two of the said lines deliver analog signals whose amplitudes are substantially linear functions of the desired co-ordinates.

2. A device according to claim 1, wherein the number of electrodes is selected in such a manner that the distance between successive pairs of adjacent electrodes is no greater than the acceptable width of a peripheral distortion margin on the resistive surface.

3. A device according to claim 2, having at least 16 electrodes.

4. A device according to claim 1, wherein the signal obtained on one of said summing lines varies as a linear function of one co-ordinate and the signal obtained on another of said summing lines varies as a linear function of the other co-ordinate.

5. A device according to claim 4, having four summing lines, wherein the signals obtained on the summing lines are the same linear functions respectively of: a first co-ordinate, minus said first co-ordinate, the other co-ordinate, and minus said other co-ordinate.

6. A device according to claim 5, including means for generating two analog signals whose amplitudes are proportional to the co-ordinates by performing a linear combination of the signals obtained on the summing lines.

7. A device according to claim 1, wherein the sum of the conductances connecting any of the electrodes to the summing lines has a predetermined fixed value G such that $R_\square$ is greater than or of the same order as: $(1/G)$; where $R_\square$ is the surface resistivity of the resistive surface and N is the number of electrodes.

8. A device according to claim 7, wherein the signals obtained on the summing lines are amplified by means of amplifiers having respective input impedances Z such that Z is less than or of the same order as:

$$\frac{1}{N} \cdot \frac{1}{G}$$

9. A device according to claim 1, wherein the resistive surface is disk-shaped.

10. A device according to claim 9, wherein the conductance $G(n, 1)$ of the resistive connection between an electrode having $\theta_n$ as its polar co-ordinate angle in said system of reference co-ordinates, and a summing line intended to provide a signal which is a linear function of the co-ordinate of a point localizing an event relative to an axis whose polar co-ordinate is $\theta_1$ in said system of reference co-ordinates, has a value which is selected to be substantially equal to $K(1+\cos(\theta_n-\theta_1))$, where K is a predetermined constant.

11. A device according to claim 1, wherein the resistive surface is rectangular in shape.

* * * * *